US 11,444,514 B2

(12) United States Patent
Wiechert et al.

(10) Patent No.: US 11,444,514 B2
(45) Date of Patent: Sep. 13, 2022

(54) SENSOR MODULE FOR MOUNTING IN A MOTOR

(71) Applicants: TE Connectivity Germany GmbH, Bensheim (DE); TE Connectivity India Private Limited, Bangalore (IN); TE Connectivity Belgium BVBA, Oostkamp (BE)

(72) Inventors: Sebastian Wiechert, Speyer (DE); Manivasakan Ravinthiran, Bangalore (IN); Bram Embo, Oostkamp (BE); Pooventhan A, Bangalore (IN); Shivaprasad B, Bangalore (IN); Ignace Vankeirisbilck, Oostkamp (BE); Kiranpal Singh, Bangalore (IN); Manjunatha D V, Bangalore (IN)

(73) Assignee: TE CONNECTIVITY INDIA PRIVATE LIMITED ET AL., Bangalore (IN)

(*) Notice: Subject to any disclaimer, the term of this patent is extended or adjusted under 35 U.S.C. 154(b) by 185 days.

(21) Appl. No.: 17/021,421

(22) Filed: Sep. 15, 2020

(65) Prior Publication Data

US 2021/0126512 A1  Apr. 29, 2021

(30) Foreign Application Priority Data

Oct. 24, 2019  (IN) .............................. 201941043195

(51) Int. Cl.
| | | |
|---|---|---|
| *H02K 11/21* | (2016.01) | |
| *H02K 11/25* | (2016.01) | |
| *G01K 1/08* | (2021.01) | |

(52) U.S. Cl.
CPC ............... *H02K 11/21* (2016.01); *G01K 1/08* (2013.01); *H02K 11/25* (2016.01)

(58) Field of Classification Search
CPC ........ H02K 11/00; H02K 11/21; H02K 11/22; H02K 11/225; H02K 11/25; H02K 11/30;
(Continued)

(56) References Cited

U.S. PATENT DOCUMENTS

| 2012/0112580 | A1* | 5/2012 | Sato ....................... H02K 11/25 310/71 |
| 2015/0155760 | A1* | 6/2015 | Bessho .................. H02K 11/25 310/680 |
| 2017/0033637 | A1 | 2/2017 | Matsuoka | |

FOREIGN PATENT DOCUMENTS

| CN | 204442103 U | 7/2015 |
| CN | 208638164 U | 3/2019 |

(Continued)

OTHER PUBLICATIONS

Extended European Search Report, European Application No. 20203346.0-1001, European Filing Date, Mar. 9, 2021.

*Primary Examiner* — Tran N Nguyen

(57) ABSTRACT

A sensor module for mounting in a motor includes a holder adapted to be mounted in a wet chamber of the motor, a temperature sensor adapted to be mounted in a dry chamber of the motor, a rotational position sensor mounted on the holder, a connector interface adapted to be plugged into a corresponding connector, and a sealing element arranged between the rotational position sensor and the temperature sensor. The temperature sensor is spaced apart from the holder. The rotational position sensor and the temperature sensor are connected via a plurality of signal lines to the connector interface. The sealing element is sealingly penetrated by the signal lines from one of the rotational position sensor and the temperature sensor.

17 Claims, 7 Drawing Sheets

(58) Field of Classification Search
CPC ........... H02K 7/00; H02K 7/006; H02K 5/00;
H02K 5/10; H02K 5/22; H02K 5/225;
G01K 1/00; G01K 1/08; G01K 1/14;
G01K 1/146; G01D 11/00; G01D 11/30
See application file for complete search history.

(56) References Cited

FOREIGN PATENT DOCUMENTS

DE 102010046520 A1 3/2012
JP 3612715 B2 * 1/2005 ............. H02K 11/33

* cited by examiner

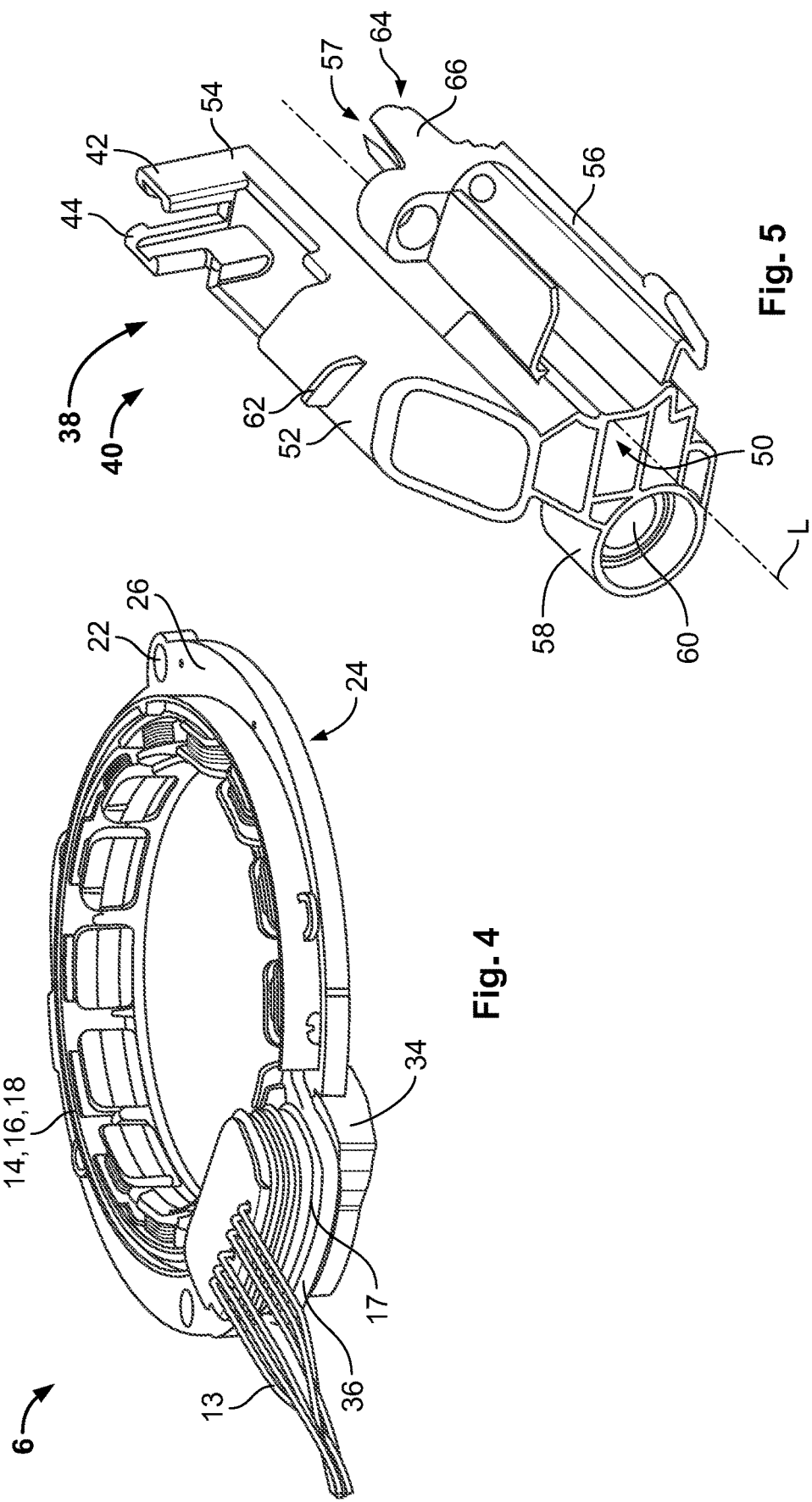

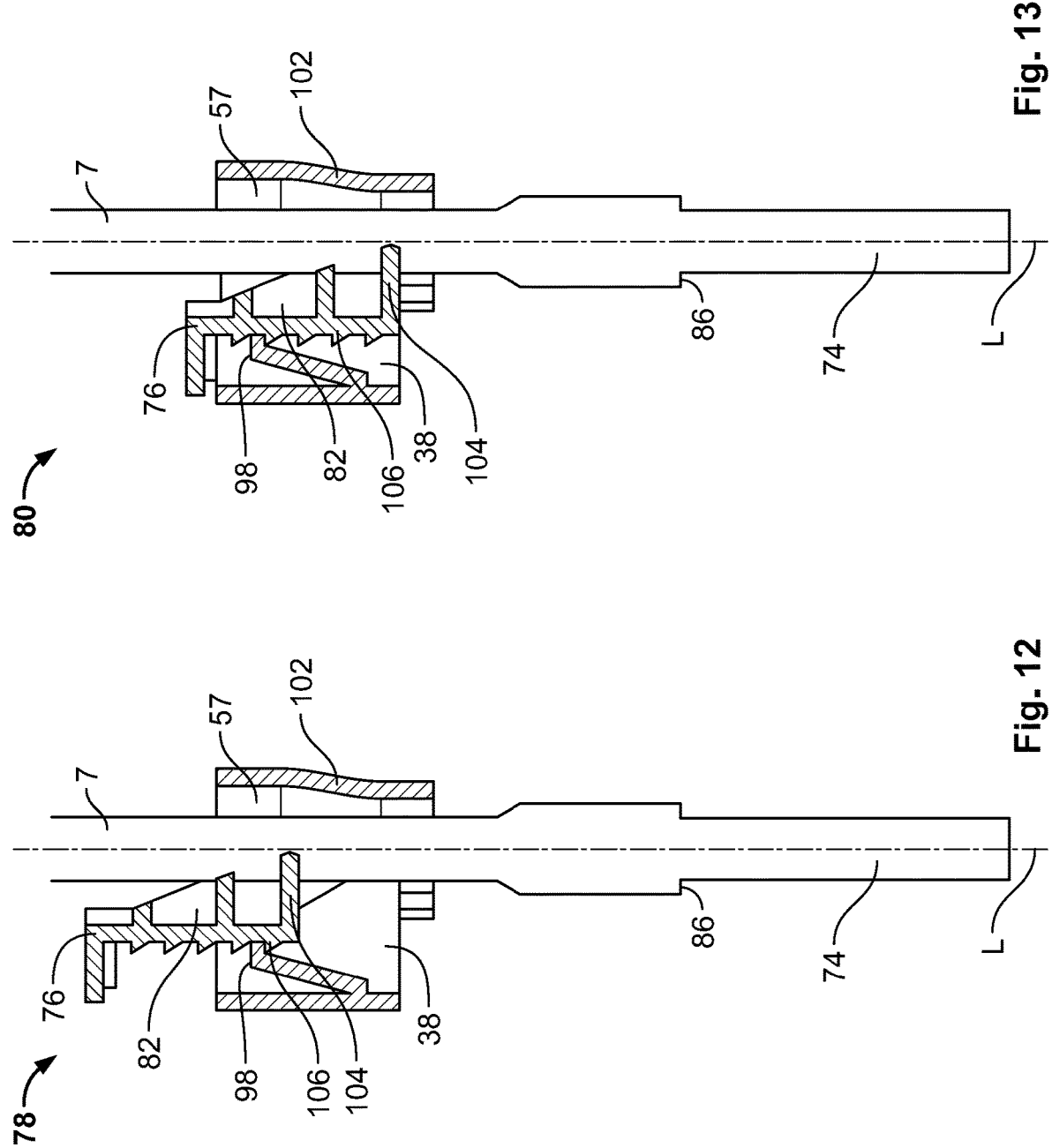

SENSOR MODULE FOR MOUNTING IN A MOTOR

CROSS-REFERENCE TO RELATED APPLICATION

This application claims the benefit of the filing date under 35 U.S.C. § 119(a)-(d) of Indian Patent Application No. 201941043195, filed on Oct. 24, 2019.

FIELD OF THE INVENTION

The present invention relates to a sensor module and, more particularly, to a sensor module for mounting in a motor.

BACKGROUND

A motor, such as an electric motor, should ideally operate to its maximum designed life. Any defects of the motor may lead to a shutdown. Therefore, sensors are utilized for analyzing and predicting the health of motors. However, motors should preferably be compact and light, particularly motors which are mounted in vehicles to reduce the amount of energy needed to move the vehicle. The limited space in the motor, however, makes it extremely difficult to install the sensors in the motor, as the handling of the sensors within the motor chamber is impaired.

SUMMARY

A sensor module for mounting in a motor includes a holder adapted to be mounted in a wet chamber of the motor, a temperature sensor adapted to be mounted in a dry chamber of the motor, a rotational position sensor mounted on the holder, a connector interface adapted to be plugged into a corresponding connector, and a sealing element arranged between the rotational position sensor and the temperature sensor. The temperature sensor is spaced apart from the holder. The rotational position sensor and the temperature sensor are connected via a plurality of signal lines to the connector interface. The sealing element is sealingly penetrated by the signal lines from one of the rotational position sensor and the temperature sensor.

BRIEF DESCRIPTION OF THE DRAWINGS

The invention will now be described by way of example with reference to the accompanying Figures, of which:

FIG. 4 is a perspective view of the holder and the rotational position sensor with a sealing cover;

FIG. 5 is a perspective view of a holding bracket of the sensor module;

FIG. 12 is a sectional side view of a position assurance member according to another embodiment in a first position; and FIG. 13 is a sectional side view of the position assurance member of FIG. 12 in a second position.

DETAILED DESCRIPTION OF THE EMBODIMENT(S)

Figure 2:
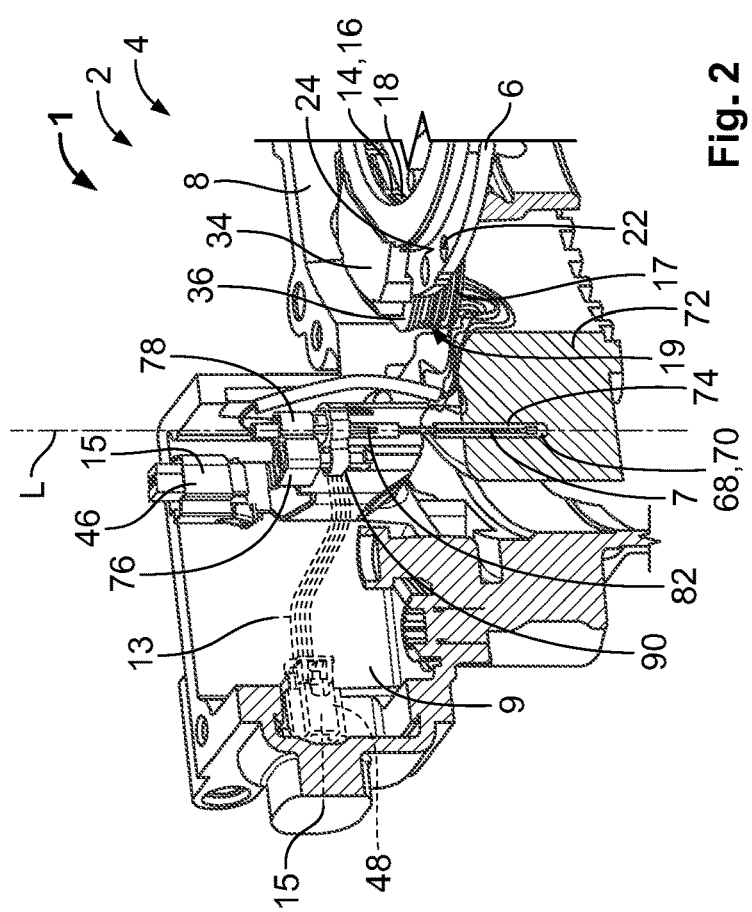
FIG. 2 is a sectional perspective view of the sensor module mounted in a motor.

In the following, the invention is described by way of the accompanying figures, which describe exemplary embodiments of the present invention. In the figures, the same reference numerals are used for elements which correspond to one another in terms of their function and/or structure. According to the description of the various aspects and embodiments, elements shown in the drawings can be omitted if the technical effects of those elements are not needed for a particular application, and vice versa: i.e. elements that are not shown or described with reference to the figures but are described herein can be added if the technical effect of those particular elements is advantageous in a specific application.

Figure 1:
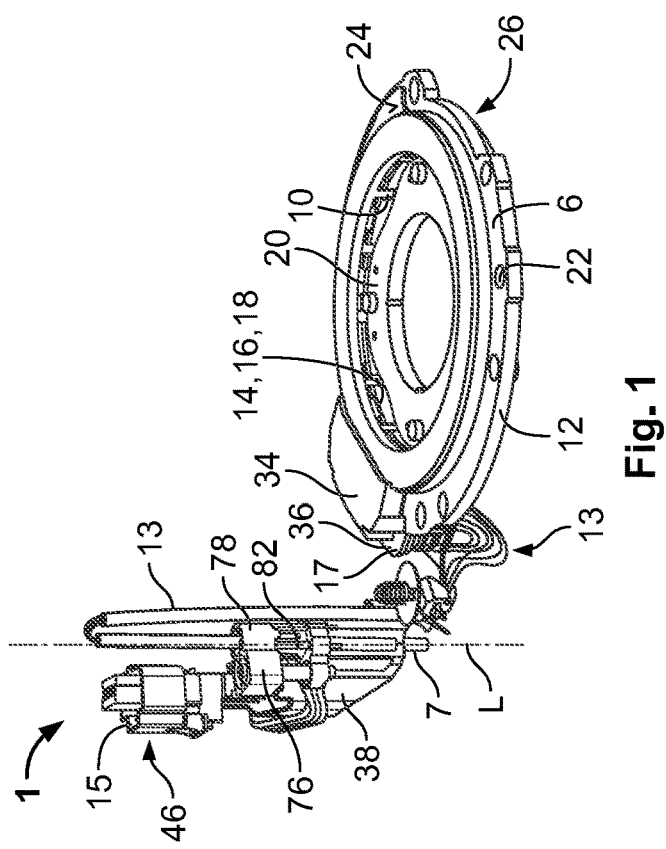
FIG. 1 is a perspective view of a sensor module according to an embodiment.

A sensor module 1 according to an embodiment is shown in FIGS. 1 and 2. FIG. 1 shows the sensor element 1 in a schematic perspective view and, in FIG. 2, the sensor module 1 is shown mounted in a motor 2, particularly an electric motor 4.

The sensor module 1, as shown in FIGS. 1 and 2, includes a holder 6 adapted to be mounted in a wet chamber 8 of the motor 2 and a temperature sensor 7 adapted to be mounted in a dry chamber 9 of the motor 2. A rotational position sensor 14 is mounted on the holder 6 and the temperature sensor 7 is spaced apart from the holder 6. The rotational position sensor 14 and the temperature sensor 7 are connected via a plurality of signal lines 13 to a connector interface 15, particularly a common connector interface 15. The connector interface 15 is adapted to be connected to a corresponding connector. Furthermore, a sealing element 17 is provided between the temperature sensor 7 and the rotational position sensor 14, which is sealingly penetrated by the signal lines 13 from one of the rotational position sensor 14 and the temperature sensor 7.

In the embodiment shown in FIGS. 1 and 2, the connector interface 15 is arranged in the dry chamber 9 of the motor 2, therefore the sealing element 17 is penetrated by the signal lines 13 from the rotational position sensor 14. The sealing element 17 may be sealingly fixed in a passage 19 of the motor 2 connecting the wet chamber 8 and the dry chamber 9. Therefore, two sensors may be integrated in a single sensor module 1, whereby one sensor may be mounted in the wet chamber 8 and the other sensor may be mounted in the dry chamber 9 of the motor 2. Consequently, the space for mounting the sensor module 1 within the motor 2 is increased, allowing an improved manageability and therefore easier installation of the sensor module 1 in the motor 2. However, in the case that the connector interface 15 should be arranged in the wet chamber 8 of the motor 2, the sealing element 17 may be penetrated by the signal lines 13 of the temperature sensor 7 sealingly leading the signal lines 13 of the temperature sensor 7 from the dry chamber 9 to the connector interface 15 in the wet chamber 8.

The holder 6, shown in FIGS. 1-4, comprises a disc-like shape, more particularly a ring-like shape, having an inner circumference 10 and an outer circumference 12. Around the inner circumference 10 a rotational position sensor 14 is mounted facing radially inwards. The rotational position sensor 14 may be a contactless sensor such as a resolver 16, wherein a stator 18 of the resolver 16 is mounted around the inner circumference 10 of the holder 6. The resolver 16 may also comprise a rotor 20, which can be attached to the shaft of the motor 2, whereby the angle is detected by an electrical signal generated due to a change in the reactance of the rotating rotor 20 and fixed stator 18. Therefore, the speed of the motor 2, particularly the rotating speed of the shaft, can be measured and subsequently controlled by sending a signal to the motor 2.

Unlike encoders, resolvers 16 have no electronic components such as circuit boards or the like. Therefore, resolvers 16 are robust against soiling, vibrations and work safely within a wide temperature range, which makes them highly reliable. Especially in motors 2, the rotational position sensor 12 is subjected to harsh environments; using a resolver 16 as rotational position sensor 14 may thus increase the reliability and life expectancy of the sensor.

For securing the holder 6 within the motor 2, the holder 6 is provided with multiple mounting holes 22, as shown in FIGS. 1-4, which extend from one face side 24 to an opposing face side 26. Therefore, the holder 6 may be fixed with, for example, bolts in the motor 2, securing the holder 6 and consequently the rotational position sensor 14 against movement due to shock or vibrations.

Figure 3:
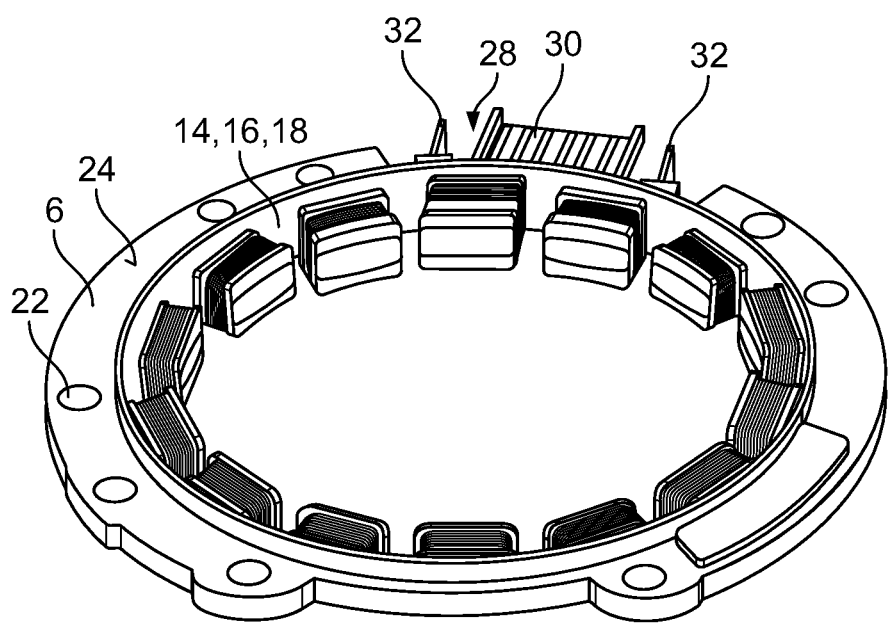
FIG. 3 is a perspective view of a holder and a rotational position sensor of the sensor module.

For a space saving assembly, the holder 6 may comprise a notch 28 along a circumferential section, as shown in FIG. 3, in which terminals 30 of the rotational position sensor 14, in this case the terminals of the stator 18, may be arranged. The terminals 30 may be connected to signal lines 13, which are connected to the connector interface 15.

In FIG. 3, a face side 24 of the holder 6 is shown. In a mounted state, in which the holder 6 is mounted in the motor 2, said face side 24 faces the wet chamber 8. The rotational position sensor 14 further comprises at least one stabilization rib 32 protruding from an outer edge of the rotational position sensor 14 into the notch 28. In an embodiment, a stabilization rib 32 is provided at either side of the terminals 30. In the wet chamber 9, the rotational position sensor 14 may come into contact with fluids such as oil. The rotational position sensor 14 may protrude beyond two opposing face sides 24, 26 from the disk-like holder 6.

To further protect the rotational position sensor 14, a sealing cover 34 shown in FIG. 4 may be provided on the face side 24 of the rotational position sensor 14. The sealing cover 34 may be potted to the rotational position sensor 14 to prevent loosening of the sealing cover 34 due to stress such as shock or vibrations. The sealing cover 34 may embed the terminals 30 and thus protrude into the notch 28. The stabilization ribs 32 may also be embedded in the potting, whereby the stabilization ribs 32 further stabilize the potting in the notch 28. The signal lines 13 of the rotational position sensor 14, which may protrude from the sealing cover 34 on the opposite face side 26, penetrate the sealing element 17, which may be arranged at the opposite face side 26. The sealing element 17 may even abut the opposite face side 26 and/or the sealing cover 34, forming a closed sealed path for the signal lines 13 between the sealing cover 34 and the sealing element 17. However, depending on the structure of the motor 26, the sealing element 17 may also be distant from the opposite face side 26 of the holder 6.

As shown in FIG. 4, the sealing element 17 in this exemplary embodiment is formed as a rubber sleeve comprising a flange portion 36 which radially protrudes from the remainder of the sealing element's body. The flange portion 36 may abut a frame of the passage 19 in the motor 2 securing the sealing element 17 from slipping through the passage 19. The remainder of the sealing element's body may be adapted to extend through the passage 19, sealing said passage between the wet chamber 8 and the dry chamber 9. The sealing element 17 may also be potted.

The temperature sensor 7 may be held by a holding bracket 38, shown in FIGS. 1 and 5. The holding bracket 38 may, in an embodiment, be formed as a monolithic component 40, for example as an injection molded component. The holding bracket 38 may comprise a connector holder 42 for removably receiving the connector interface 15. The connector holder 38 may comprise holding arms 44 facing each other, each holding arm 44 having a guiding notch 46 in which a guiding rail or protrusion of the connector interface 15 can be inserted, fixing the interface to the holding bracket 38. Of course, other means for removably fixing the connector interface 15 to the holding bracket 38 may be envisioned, such as the connector holder 42 having a locking latch, which may engage a locking projection of the connector interface 15.

The connector interface 15 may be fixed to the holding bracket 38 in a testing position 46, which is shown in FIGS. 1 and 2. In the testing position 46, the connector interface 15 may easily be connected to testing equipment for end of line testing. The sensor module 1 may be provided in the testing position 48 before mounting, allowing an easier installation of the sensor module 1 as the connector interface 15 is secured on the holding bracket 38 and does not get in the way while handling the sensor module 1. The user can concentrate on holding and positioning the remaining parts of the sensor module 1 without any unnecessary consideration of the connector interface 15.

In a second position, particularly an application position 48, in which the connector interface 15 may be connected to a complementary connector for the application purposes, the connector interface 15 may be detached from the holding bracket 38, particularly the connector holder 38. The connector interface 15 being in the application position 48 is schematically displayed in FIG. 2 with dashed lines.

The holding bracket 38 may comprise a center stem 50, shown in FIG. 5, extending essentially parallel to a longitudinal axis L. Further functional parts can project from the circumference of the center stem 50. For example, a pillar 52 with a free end 54, on which the connector holder 42 may be formed, may project from the circumference of the center stem 50 and may extend essentially parallel to the longitudinal axis L beyond the center stem 50. Furthermore, a further pillar 56 may project from another side of the circumference and extend essentially parallel to the longitudinal axis L beyond the center stem 50. The further pillar 56 may feature a through-hole 57 for receiving the temperature sensor 7. Consequently, the holding features for holding the connector interface 15 and the temperature sensor 7 are locally separated, reducing the risk of entanglement of the signal lines 13.

According to a further advantageous aspect, a mounting projection 58 shown in FIG. 5 may project from the center stem 50, the mounting projection 58 being adapted to receive a bush 60, particularly a ring shaped bush, which can engage a complementary formed mounting feature of the motor 2, therefore fixing the holding bracket 38 in the motor 2.

At least in the testing position 46, the signal lines 13 may be at least partially wound around the pillar 52 to neatly arrange the signal lines 13 during installation. Consequently, the signal lines 13 do not interfere by getting in the way, getting stuck and/or getting entangled. For guiding the signal lines 13 around the pillar 52 and preventing shifting of the signal lines 13 along the pillar 52, the pillar 52 may be provided with a protruding rib 62 protruding from an outer surface of the pillar 52.

As shown in FIG. 2, the signal lines 13 may be unwound from the pillar 52 in the application position 48. The unwinding of the signal lines 13 provides an increased leeway in positioning the connector interface 15. Consequently, the sensor module 1 may be applicable for various motors being different from one another in at least one of size and structure.

The temperature sensor 7, shown in FIGS. 1 and 2, may be pin shaped comprising a body extending parallel to the longitudinal axis L through the through-hole 57 of the holding bracket 38, particularly the further pillar 56 of the holding bracket 38. The temperature sensor 7 may be inserted in the through-hole 57 through a closing mouth 64 formed by circumferentially arranged, elastically deflectable latches 66, which press against the sensor body, stabilizing the temperature sensor 7 in the holding bracket 38. The relative position between the temperature sensor 7 and the holding bracket 38 essentially parallel to the longitudinal axis L may be adjusted, allowing for a tolerance compensation. The temperature sensor 7 may be adapted to be inserted into a hole 68, particularly a blind hole 70 of the motor's winding 72, as is depicted in FIG. 2. Particularly, a tip 74 of the temperature sensor 7 may be adapted to be inserted into the hole 68, particularly the blind hole 70. The temperature sensor 7 or the tip 74 carries a plurality of sensing elements of the temperature sensor 7. The temperature sensor 7 is encircled by the coil windings 72, improving the sensing accuracy of the temperature sensor 7.

At least the tip 74 may comprise a cross-section in a plane essentially perpendicular to the longitudinal axis L, which is corresponding to the cross-section of the hole 68 in the motor's winding 72. In an embodiment, the cross-section may be rotationally symmetrical, for example circular, so that the insertion of the temperature sensor 7 into the hole 68 is possible regardless of the temperature sensor's relative rotational positon to the hole 68. The tip 74 may comprise a different cross-section than the remainder of the temperature sensor's body. For example, the tip 74 may comprise a circular cross-section while the remainder of the sensor's body may comprise a quadrangular cross-section, or a rectangular cross-section. The width of the wider side of the quadrangular cross-section and the diameter of the circular cross-section may be essentially equal.

If an arrangement of the temperature sensor 7 in a predetermined rotational position relative to the hole 68, particularly the blind hole 70, is desired, the temperature sensor 7 and/or the hole 68, particularly the blind hole 70, may comprise at least one coding feature. The temperature sensor 7 may for example comprise a rotationally asymmetrical shape complementary to the hole 68, particularly the blind hole 70.

The temperature sensor 7, in an embodiment, may be a negative temperature coefficient sensor (NTC), wherein at least the tip 74 is encapsulated. The encapsulation may comprise a resin, such as an epoxy resin. Epoxy resins have a high thermal conductivity, which allows the sensor elements encapsulated in the epoxy resin to sense the temperature without high losses. In an embodiment, the encapsulation may be formed by a fluoropolymer such as polytetraflouroethylene (PTFE) and perfluoroelastomer (PFE), which may prolong the life cycle of the temperature sensor 7 in harsh environments due to its good resistance to solvents, acids and bases. Furthermore, the high thermal conductivity and thermal diffusivity of fluoropolymers allows for a fast transfer of the heat to the tip 74 of the temperature sensor 7 without high losses.

The temperature sensor 7 may further at least partially be sleeved by a heat shrink sleeve, further protecting the temperature sensor 7. Particularly, the part of the temperature sensor 7 arranged in the holding bracket 38 may be sleeved by the heat shrink sleeve.

At the end opposing the tip 74, the temperature sensor 7 may be connected to signal lines 13, which connect the sensing elements of the temperature sensor 7 to the connector interface 15.

A position assurance member 76 may be provided, as shown in FIGS. 1 and 2, which may be securable in at least two positions on the holding bracket 38. In the first position of the at least two positions, the position of the temperature sensor 7, particularly at least one of the rotational position and position essentially parallel to the longitudinal axis L, relative to the holding bracket 38 may be movable. In the second position of the at least two positions, the position of the temperature sensor 7, particularly at least one of the rotational position and position essentially parallel to the longitudinal axis L, relative to the holding bracket 38 may be fixed. Therefore, the position of the temperature sensor 7 may be adjusted in the first position of the at least two positions and subsequently secured in the second position of the at least two positions.

The interaction of the position assurance member 76 and the temperature sensor 7 is further elucidated with reference to FIGS. 6-13.

Figure 7:
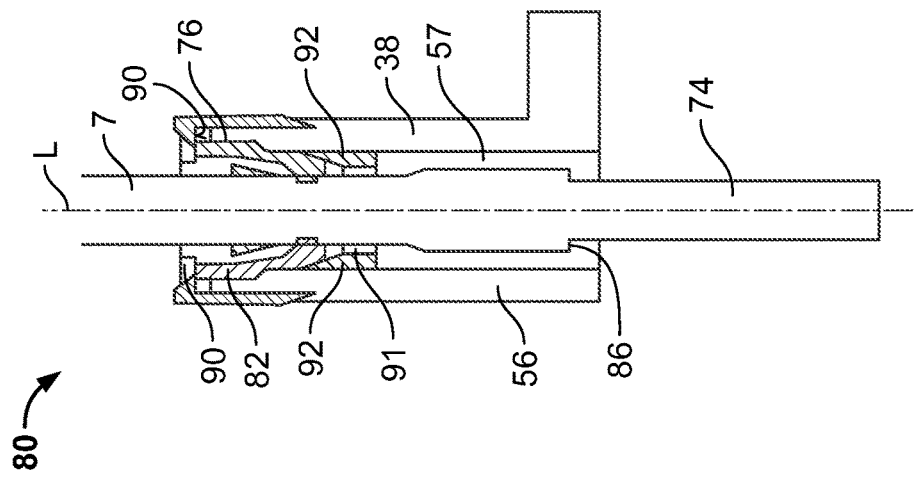
FIG. 7 is a sectional side view of the position assurance member of FIG. 6 in a second position.
Figure 6:
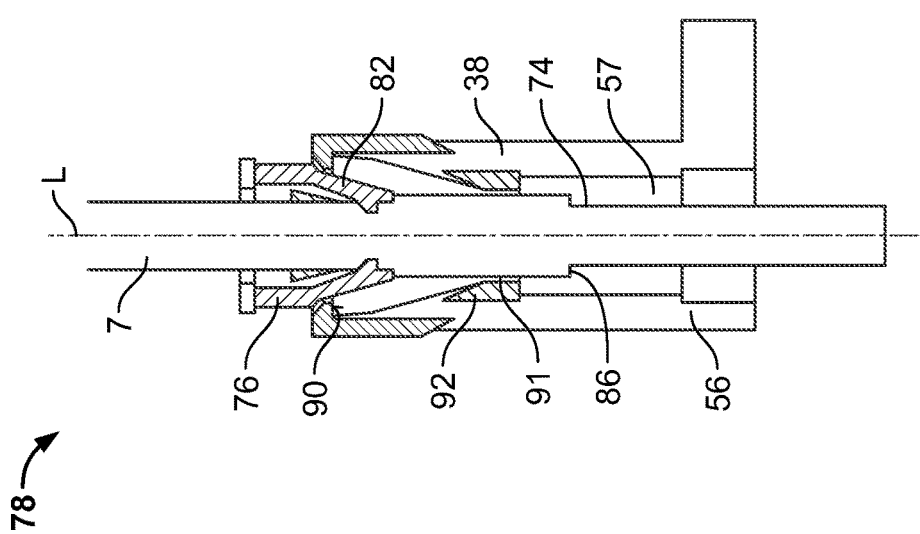
FIG. 6 is a sectional side view of a position assurance member according to an embodiment in a first position.

A first exemplary embodiment of the position assurance member 76 is shown in FIGS. 6 and 7. In FIG. 6, the position assurance member 76 is shown in the first position 78 of the at least two positions and, in FIG. 7, the position assurance member 76 is shown in the second position of the at least two positions 80.

In the embodiment shown in FIGS. 6 and 7, the position assurance member 76 comprises at least one locking prong 82 nestling to the outer circumference of the temperature sensor 7. Consequently, the temperature sensor 7 is held by the locking prongs 82. A plurality of locking prongs 82 may be arranged around the circumference of the temperature sensor 7. The locking prongs 82 extend into the through-hole 57 forming an opening 84, which is essentially concentric to the through-hole 57. The at least one locking prong 82 comprises circumferentially extending flaps for neatly nestling to the outer contour of the temperature sensor. In the first position, the at least one locking prong 82 press only lightly against the outer contour of the temperature sensor 7, so that the position of the temperature sensor 7 may be adjusted relative to the position assurance member 76 and the holding bracket 38.

In order to limit the movement of the temperature sensor 7 and further fool proofing the sensor module 1, the temperature sensor 7 may comprise a limit stop 86 protruding radially from the temperature sensor's body, as shown in FIGS. 6 and 7. The limit stop 86 may be adapted to abut the frame of the hole 68 in the motor's winding. Therefore, the temperature sensor 7 is stopped from a too deep insertion into the hole 68, preventing the tip 74 to hit the bottom of the hole and potentially be damaged. The heat shrink sleeve sleeved at least partially around the temperature sensor 7 may form the limit stop 86.

The limit stop 86 may also provide an abutment surface at an opposite end distanced from the temperature sensor's tip 74. The at least one locking prong 82 may abut the abutment surface in the first position 78 of the at least two positions and push the temperature sensor along when moving the position assurance member 76 from the first position 78 to the second position 80. Therefore, a minimal depth in which the temperature sensor 7 is inserted into the hole 68 may be respected. Furthermore, the temperature sensor 7 may be guided by the position assurance member into the hole 68.

In the second position shown in FIG. 7, the position assurance member 76 may be fully inserted into the through-hole 57, whereby a front end of the position assurance member 76 engages an undercut 90 of the holding bracket 38 locking the position assurance member 76 in the second position 80. The at least one locking prong 82 is inserted into a slot 91 between the temperature sensor 7 and a rigid pressing protrusion 92 formed in the through-hole 57. The pressing protrusion 92 may prevent loosening of the pressing force with which the at least one locking prong 82 is pressed against the temperature sensor. The slot 91 may be dimensioned such that the inserted locking prong 82 is clamped between the pressing protrusion 92 and the temperature sensor 7 and therefore increasing the pressing force of the at least one locking prong 82 to the temperature sensor 7 so that the temperature sensor 7 is secured in the holding bracket 38 by an interference fit.

In the first position 78, the temperature sensor 7 may be mobile to enable height adjustment in the application. In the second position 80, the temperature sensor 7 is fixed at the desired height and is secured against movement due to vibrations and/or shock.

Figure 9:
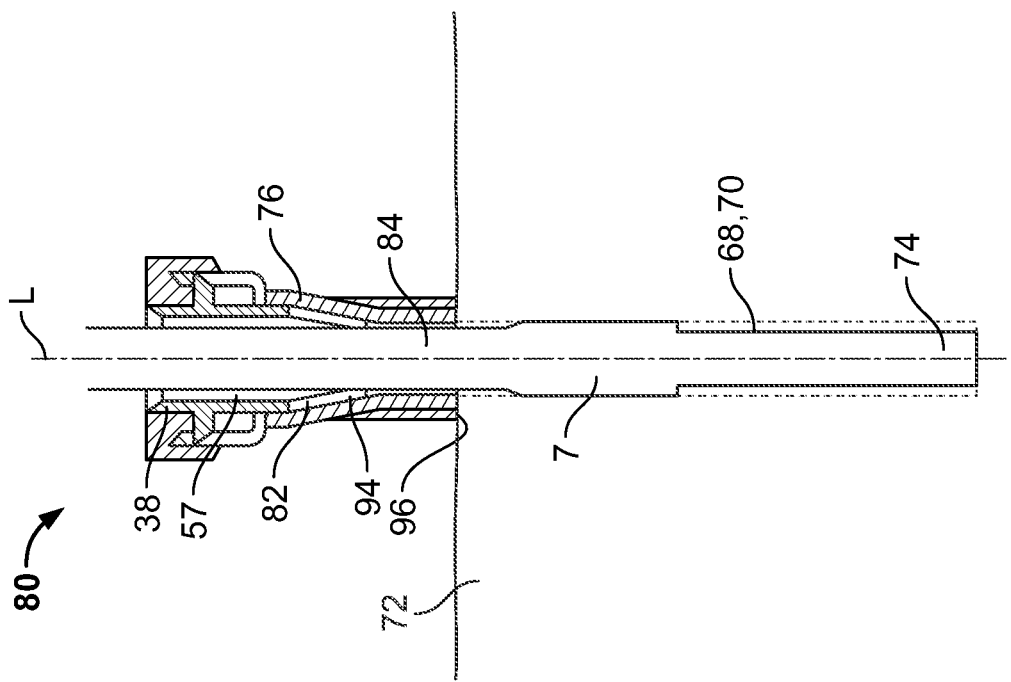
FIG. 9 is a sectional side view of the position assurance member of FIG. 8 in a second position.
Figure 8:
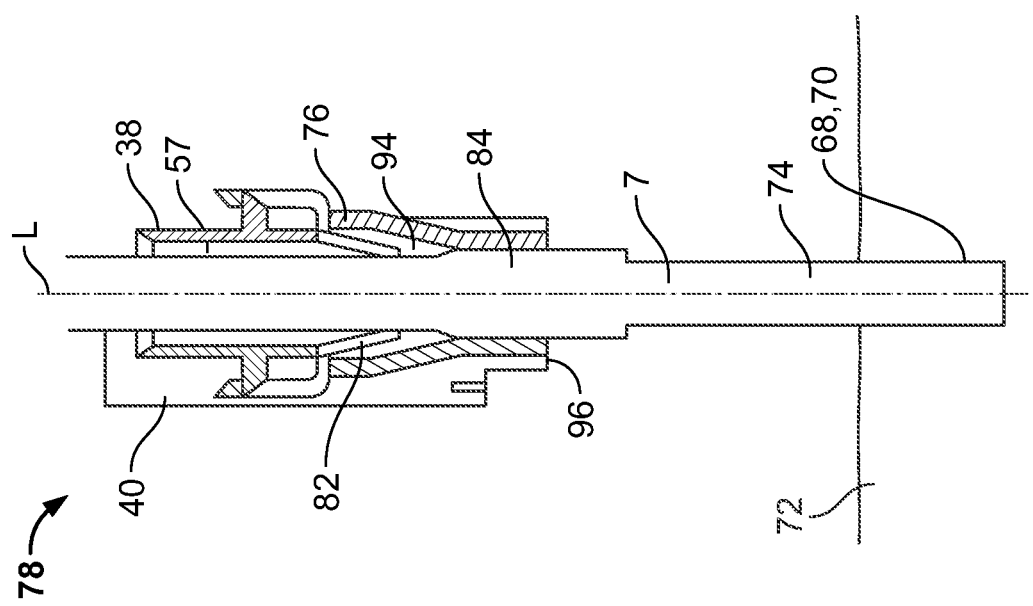
FIG. 8 is a sectional side view of a position assurance member according to another embodiment in a first position.

In the second exemplary embodiment, shown in FIGS. 8 and 9, the position assurance member 76 may be arranged on the side of the through-hole 57 directed towards the tip 74 of the temperature sensor 7. The position assurance member 76 is sleeved around the further pillar 56 comprising the through-hole 57, whereby the position assurance member 76 tapers towards the tip 74 and is subsequently sleeved around the temperature sensor 7. The tapering of the position assurance member 76 forms a pocket 94 in the interior of the position assurance member 76, wherein in the second position 80 of the at least two positions the at least one locking prong 82, which is formed integrally in the through-hole 57 of the holding bracket 38, is received in said pocket 94. The locking prong 82 is thus pressed against the temperature sensor 7 fixing it by an interference fit. A front end 96 of the position assurance member 76 may be adapted to abut a top surface of the motor's winding 72, so that upon further insertion of the temperature sensor 7 into the hole 68 the position assurance member 76 is pushed upward, away from the tip 74 of the temperature sensor 7, into the second position 80 of the at least two positions, as shown in FIG. 9.

Figure 10:
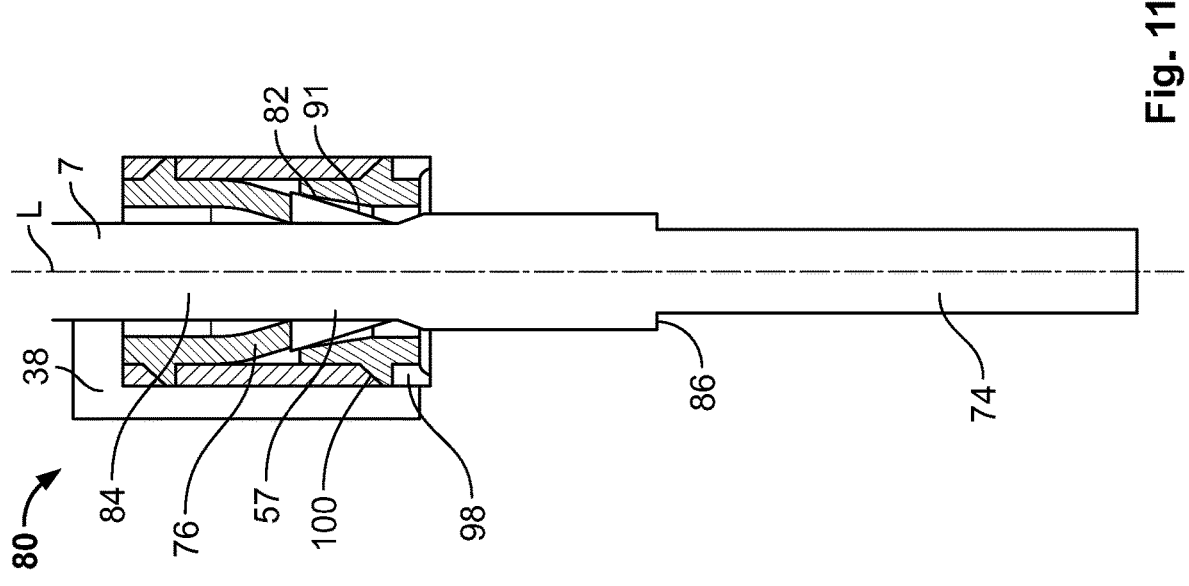
FIG. 10 is a sectional side view of a position assurance member according to another embodiment in a first position.
Figure 11:
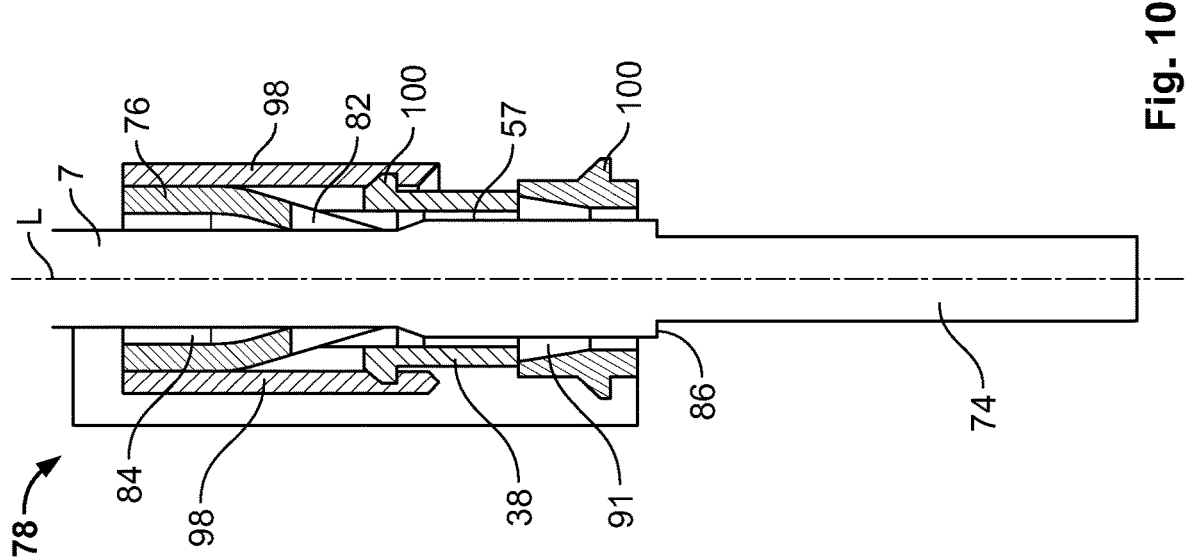
FIG. 11 is a sectional side view of the position assurance member of FIG. 10 in a second position.

In FIGS. 10 and 11, the at least one locking prong 82 abuts the limit stop 86 to simultaneously guide the temperature sensor's tip 74 into the hole 68 while moving the position assurance member 76 from the first 78 to the second position 80. The position assurance member 76 further comprises locking latches 98, which are engaged to locking ribs 100 formed on an outer surface of the holding bracket 38 in the first 78 and second position 80, in a positive fitting manner. Consequently, the position assurance member 38 may be securely fixed in the first 78 and second position 80.

In a further embodiment shown in FIGS. 12 and 13, the position assurance member 76 is arranged on one side of the temperature sensor 7 opposing a tapering wall 102 of the holding bracket 38 reducing the width of the through-hole 57. The position assurance member 76 comprises a locking prong 82 formed as a rib that nestles against the outer contour of the temperature sensor 7 parallel to the longitudinal axis L. Furthermore, stabilizing clamps are provided, the clamps partly extending around the circumference of the temperature sensor 7, so as to hold the temperature sensor 7. On the side facing away from the temperature sensor 7, the position assurance member 76 comprises multiple protruding teeth 106, which may engage a locking latch 98 in a positive fit blocking a movement of the position assurance member 76 relative to the holding bracket 38 away from the tip 74 of the temperature sensor 7. Each tooth 106 corresponds to a position, at which the position assurance member 76 may be secured. At the first position 78 the temperature sensor 7 may be moved, allowing for an adjustment of the temperature sensor's position. With each incrementing position, the distance between the locking prong 82 and the tapering wall 102 decreases, leading to an increasing pressing force of the locking prong 82 to the temperature sensor 7. Consequently, the pressing force can be adapted depending on the application requirements.

The sensor module 1 may partly be mounted in the wet chamber 8 of the motor 2 and partly be installed in the dry chamber 9 of the motor 2, allowing a user to make the best out of the limited space in the motor 2. The installation of the sensor module 1 is no longer limited to the wet chamber 8 or the dry chamber 9, increasing the space for the installation and thus manageability of the sensor module 1 within the motor 2. Furthermore, the rotational position sensor 14 and the temperature sensor 7 are integrated in a single sensor module reducing the error margin during installation. The user does not have to procure the temperature sensor 7 and rotational position sensor 14 separately and then integrate them during the production line in the confined space of the motor 2 after mounting.

What is claimed is:

1. A sensor module for mounting in a motor, comprising:
   a holder is mounted in a wet chamber of the motor;
   a temperature sensor is mounted in a dry chamber of the motor, the temperature sensor spaced apart from the holder;
   a rotational position sensor mounted on the holder;
   a connector interface is plugged into a corresponding connector, the rotational position sensor and the temperature sensor are connected via a plurality of signal lines to the connector interface; and
   a sealing element arranged between the rotational position sensor and the temperature sensor and being sealingly penetrated by the signal lines from one of the rotational position sensor and the temperature sensor.

2. The sensor module of claim 1, wherein the sealing element extends from one face side to an opposing face side of the holder.

3. The sensor module of claim 1, wherein the rotational position sensor includes a sealing cover closing the sealing element from at least one side.

4. The sensor module of claim 1, further comprising a holding bracket holding the temperature sensor.

5. The sensor module of claim 4, wherein the holding bracket includes a connector holder removably fixing the connector interface to the holding bracket in a testing position.

6. The sensor module of claim 5, wherein, at least in the testing position, the plurality of signal lines connecting the rotational position sensor and/or the temperature sensor to the connector interface are at least partially wound around the holding bracket.

7. The sensor module of claim 5, wherein the connector interface is spaced apart from the holding bracket in an application position for connecting the connector interface to a complementary connector.

8. The sensor module of claim 5, wherein the holding bracket has a through-hole and the temperature sensor extends through the through-hole.

9. The sensor module of claim 1, wherein the temperature sensor has a limit stop projecting radially and limiting an insertion depth of the temperature sensor.

10. The sensor module of claim 1, wherein the temperature sensor has a tip with an essentially rotationally symmetrical cross-section.

11. The sensor module of claim 10, wherein the tip has a different cross-section than a remainder of the temperature sensor.

12. The sensor module of claim 4, further comprising a position assurance member is secured in at least two positions on the holding bracket.

13. The sensor module of claim 12, wherein a relative position between the temperature sensor and the holding bracket is movable in a first position of the at least two positions, and the relative position between the temperature sensor and the holding bracket is fixed in a second position of the at least two positions.

14. The sensor module of claim 13, wherein, the position assurance member comprises at least one locking prong; and wherein, in the second position of the at least two positions, the at least one locking prong is pressed against the temperature sensor.

15. The sensor module of claim 14, wherein the locking prong and the position assurance member are formed integrally with one another as a monolithic component.

16. The sensor module of claim 13, wherein the position assurance member guides the temperature sensor parallel to a movement from the first position of the at least two positions to the other positions of the at least two positions.

17. A motor, comprising:
a wet chamber;
a dry chamber;
a passage connecting the wet chamber and the dry chamber; and
a sensor module including a holder mounted in the wet chamber, a temperature sensor mounted in the dry chamber, a rotational position sensor mounted on the holder in the wet chamber, a connector interface is plugged into a corresponding connector, and a sealing element arranged between the rotational position sensor and the temperature sensor and sealingly fixed in the passage, the temperature sensor is spaced apart from the holder, the rotational position sensor and the temperature sensor are connected via a plurality of signal lines to the connector interface, the sealing element is sealingly penetrated by the signal lines from one of the rotational position sensor and the temperature sensor.

* * * * *